United States Patent [19]
Perlman

[11] Patent Number: 5,901,227
[45] Date of Patent: May 4, 1999

[54] METHOD AND APPARATUS FOR IMPLEMENTING PARTIAL AND COMPLETE OPTIONAL KEY ESCROW

[75] Inventor: Radia J. Perlman, Acton, Mass.

[73] Assignee: Novell, Inc., Orem, Utah

[21] Appl. No.: 08/666,968

[22] Filed: Jun. 20, 1996

[51] Int. Cl.$^6$ .................................................. H04K 1/00
[52] U.S. Cl. ................................. 380/21; 380/30; 380/28
[58] Field of Search .................................. 380/28, 21, 30, 380/25, 23

[56] References Cited

U.S. PATENT DOCUMENTS

| | | | |
|---|---|---|---|
| 5,276,737 | 1/1994 | Micali | 380/30 |
| 5,349,642 | 9/1994 | Kingdon | 380/25 |
| 5,553,139 | 9/1996 | Ross et al. | 380/4 |
| 5,553,143 | 9/1996 | Ross et al. | 380/25 |
| 5,557,346 | 9/1996 | Lipner et al. | 380/30 |
| 5,557,765 | 9/1996 | Lipner et al. | 380/30 |
| 5,651,068 | 7/1997 | Klemba et al. | 380/25 |
| 5,666,414 | 9/1997 | Micali | 380/30 |
| 5,710,814 | 1/1998 | Klemba et al. | 380/28 |
| 5,764,772 | 6/1998 | Kaufman et al. | 380/30 |
| 5,768,388 | 6/1998 | Goldwasser et al. | 380/30 |
| 5,796,830 | 8/1998 | Johnson et al. | 380/30 |
| 5,799,086 | 8/1998 | Sudia | 380/30 |
| 5,815,576 | 9/1998 | Johnson et al. | 380/30 |
| 5,835,596 | 11/1998 | Klemba et al. | 380/25 |

OTHER PUBLICATIONS

Press Conference, RSA Crypto conference in San Francisco, Jan. 16, 1996, Differential Workfactor Cryptography (3 pages).

*Primary Examiner*—Max H. Noori
*Assistant Examiner*—Robin C. Clark
*Attorney, Agent, or Firm*—Cesari and McKenna, LLP

[57] ABSTRACT

A key escrow technique reliably notifies an encrypting principal about escrow authorities requiring access to a secret key used to encrypt information and, further, about how much of that key is required by the authorities. The technique comprises a mechanism for storing escrow instructions pertaining to the authorities' keys in a designated location accessible by the encrypting principal. For example, the designated location may comprise a licensing string of a hardware or software add-on module needed to activate a cryptographic system of a data processing system. The escrow instructions may be further stored in an escrow formation field of a certificate. Here, the certificate may be the encrypting principal's certificate, a recipient principal's certificate and/or any certificate authority's certificate needed for the encrypting principal to verify the recipient principal's certificate.

20 Claims, 4 Drawing Sheets

METHOD AND APPARATUS FOR IMPLEMENTING PARTIAL AND COMPLETE OPTIONAL KEY ESCROW

FIELD OF THE INVENTION

The invention relates generally to cryptography in data processing systems and, more specifically, to encryption key escrow in distributed data processing and network Systems.

Cryptography involves methods of secure communication for protecting information stored within data processing systems and accessible through distributed data processing network systems. The systems generally include various computer nodes which are, in the case of a distributed network system, interconnected by communications media. The computer nodes may include nodes that are directly accessed by users, e.g., workstations, and nodes g specialized applications, e.g., servers. These nodes, the processes running on these nodes, and the users of the data processing system are generally referred to as "principals."

One known method of secure communication is secret key cryptography which involves the use of a single, shared secret key. Here, a source of information encodes ("encrypts") information and the recipient of the information decodes ("decrypts") it using the shared encryption key. An encryption key is a code or number which, when taken together with an encryption algorithm, defines a unique transformation used to encrypt or decrypt information; in the case of secret key cryptography, the key may be a random nonce.

Another example of a secure crytographic function is public key cryptography in which each principal has a public encryption key and a private encryption key, and two principals can communicate knowing only each others public keys. Specifically, information encoded with a public key may be decoded only by using a complementary private key, with the associated public and private keys defining a key pair. According to this type of encryption, the private key is known only to the owner of the key, while the public key is known to other principals in the system.

Public key cryptography may be used in such a way as to ensure confidentiality of the information being transmitted, i.e., to ensure that the information may not be understood by an eavesdropper, as well as to ensure the authenticity of the source of the information. To effect a secure transmission of information to a recipient principal, an encrypting principal, e.g., a source of the information, encrypts the information with the recipient's public key. Since only the intended recipient has the complementary private key, only that principal can decrypt it. On the other hand, to prove to a recipient of information that the source is who he purports to be, the source encodes ("signs") the information with its private key. If the recipient can decode "verify" ) the information, it knows that the source has correctly identified itself.

In both secret and public key cryptography, each principal is responsible for knowing (and keeping secret) its shared or private encryption key in order to ensure confidentiality of the encrypted information. This responsibility is balanced by the need to recover the encrypted information if the principal loses its encryption key. Key escrow generally comprises techniques for "backing up" encryption keys to ensure that they may be retrieved in the event they are lost.

Often, key escrow is required by more than one escrow authority. An escrow authority is a principal, other than the intended recipient, that legitimately requires the capability to decipher encrypted information. For example, an employer may wish to escrow all encryption keys associated with its business so that its system administrators can decrypt any information encrypted by its employees. In addition, governments (both domestic and foreign) may require that encryption keys of exported products or of information within their jurisdication be escrowed with keys known to those governments.

As for this latter case, there are situations where designation of an escrow authority or "agent" may be required for escrowing an encryption key of a hardware or software "add-on" module needed to activate a cryptographic system, depending upon whether the module is destined for domestic (United States) or foreign (non-United States) markets. For example, the United States (US) government does not require escrow of an encryption key for an add-on module that is distributed within the US. However, for those versions of modules exported from the US, the US government currently requires escrow for secret key bits in excess of 40; in other words, bits 41-n of the key are encrypted with a public key of the US government in accordance with conventional key escrow techniques. According to such techniques, an encrypting principal typically provides an encrypted public key of the US government within an area of the module called a "licensing string".

One problem with the approach described above is its non-flexibility to accomodate changes to escrow authority keys. In other words, if the US government key changes, then the hardware or software module has to be retrofit to accommodate that changed key. Also, the approach described above does not allow other governments or private sector employers to specify their public keys within the module. Moreover, this approach does not provide a means for informing an encrypting principal as to which agents require key escrow for its encrypted information.

In public key cryptography, all the public keys are generally accessible from one convenient location, such as a directory service. Namespace services typically impose a uniform structure on the information stored in directory services. A namespace is a collection of information managed by, e.g., a network operating system, and a namespace service is the entity that stores and organizes that information. Information such as the principal's name and its corresponding public key are cryptographically bound within a certificate that is signed by a certificate authority (CA) and stored in the appropriate namespace. A principal with knowledge of CA's public key can "trust" the information in the certificate because the CA's signature on the certificate cannot be forged. However, the certificate generally does not provide a means for identifying the public key of an escrow authority requiring "escrow access" to the secret key and, fer, about how much of that key is required by the authority.

The present invention addresses these problems and specifically, is directed to customizing hardware and software add-on modules or certificates that require specification of escrow authorities for secret keys.

SUMMARY OF THE INVENTION

The present invention comprises a technique for reliably notifying an encrypting principal about an escrow authority requiring access to a secret key used to encrypt information and, further, about how much of that key is required by the authority. Broadly stated, the technique comprises a mechanism for storing escrow instructions pertaining to the authority's key in a designated location accessible by the encrypting principal. For example, the designated location may comprise a licensing string of a hardware or software add-on module needed to activate cryptographic software programs of a data processing system. The escrow instructions may be further stored in an escrow information field of a certificate. The certificate may comprise the encrypting principal's certificate, a recipient principal's certificate and/or any certificate authority's certificate needed for the encrypting principal to verify the recipient principal's certificate. Thus, the invention specifies an elegant technique for providing such instructions in an easy-to-know and easy-to-access location.

The escrow instructions preferably comprise a set of elements that include, at a minimum, a list of public keys of predetermined escrow authorities along with a maximum number of unescrowed secret key bits. For example, the US government requires escrow of all but 40 bits of a secret key. In addition, elements of the escrow instructions may include (i) an escrow group and related instructions and (ii) a pointer to escrow information to reduce data storage requirements of the module or certificate.

As for the latter element, instead of storing the actual escrow information within the certificate, the pointer can be placed in the escrow information field to refer to a name within a namespace of directory services. Alternatively, a unique identification (UID) may be substituted for the pointer, where the UID also refers to a name in the namespace. In both cases, the name provides information needed to reference a location in the namespace for accessing the appropriate escrow instructions.

The invention fer provides a mechanism for optimizing storage capacity within the namespace by apportioning the escrow information among various certificates. Rather than placing all of the escrow instructions within the certificate of, e.g., a particular source or recipient, some of the instructions may be placed within its ancestor certificates in accordance with a "chain of certificates" approach.

The above and fer advantages of the invention may be better understood by referring to the following description in conjunction with the accompanying drawings, in which like references indicate similar elements, and in which.

DETAILED DESCRIPTION OF ILLUSTRATIVE EMBODIMENT

Figure 1:
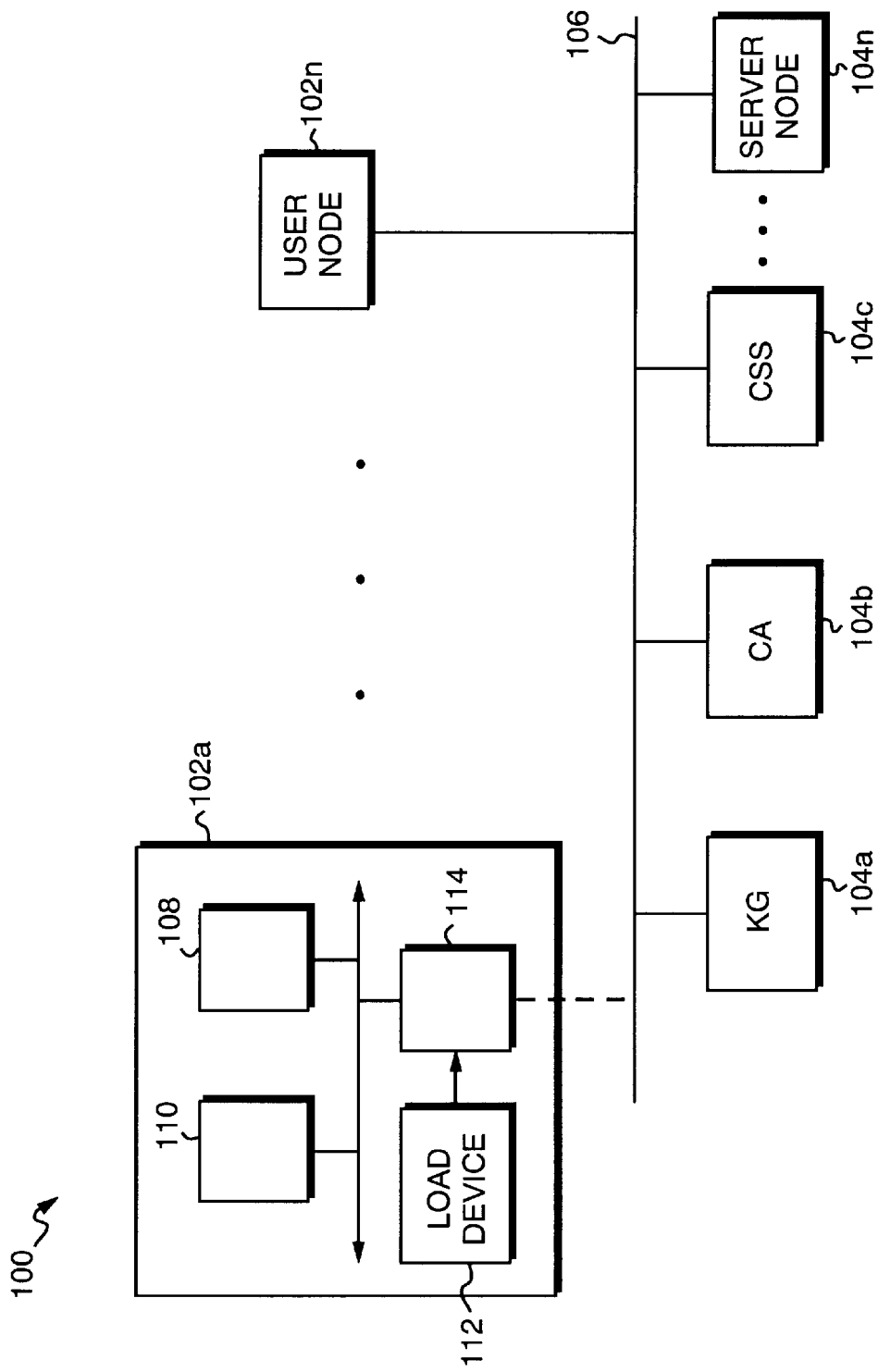
FIG. 1 is a schematic block diagram of a distributed data processing and network system in which the present invention may be advantageously used.

Referring to FIG. 1, a distributed data processing and network system 100 includes a plurality of computer nodes, such as user nodes 102a-n and various server nodes 104a-n which are, in the case of a distributed network system, interconnected by a communications medium 106. The user node, e.g., a workstation 102, is a computer generally configured for use by one user at a time, whereas each server 104 is a computer resource running specialized software applications and services, typically for use by many users.

As noted, these nodes, the processes running on these nodes, and the users of the system are generally referred to as "principals".

Each of the computer nodes includes memory means 108 for storing software programs and data structures associated with cryptographic methods and techniques. Examples of the cryptographic methods and techniques described herein are secret and public key cryptography, the latter of which is preferably an RSA encryption technique, although other public key systems may be used. Operation of these cryptography Systems to ensure confidentiality and authentication may be understood without reference to the mathematical transformations that are used for encryption and decryption.

In addition, the nodes fer include processor means 110 for executing the software programs, including various algorithms for generating numbers and codes associated with, e.g., encryption keys, and for manipulating the stored data structures. It will be apparent to those skilled in the art that other processor and memory means, such as encoding and decoding devices, may be used within the teachings of the invention to implement the cryptographic methods and techniques. An example of these devices is disclosed in U.S. Pat. No. 4,405,829 titled, *Cryptogaphic Communications System and Method*, by Rivest et al., which patent is hereby incorporated by reference as though fully set forth herein.

In general, the workstation 102a may be a standalone computer configured to execute program code associated with a hardware or software add-on module, the latter being loaded into the memory 108 via a conventional load device, such as a compact or floppy disc 112. The device 112 is generally coupled to the node 102 through an I/O adapter 114. Additionally, the workstation 102a may be a node on the distributed network system 100 when coupled to medium 106 via the adapter. When operating in this latter mode, the workstation preferably provides an interface to a principal (e.g., a user) accessing specialized server applications executing on the server nodes 104. An example of such a specialized server application is a key generator K(G) 104a configured to create a private/public key pair for the principal.

Specifically, the KG 104a selects the private/public key pair at random and either generates or accepts from the principal an encryption key used to encrypt the private key. The KG must operate in a trustworthy fashion to reliably generate and encrypt the private key; in addition, the server 104a is required to "forget", i.e., erase, that generated private key. Further, the KG must reliably communicate the generated public key to a certification authority (CA) 104b, so that the CA may cryptographically bind the public key and principal's name in a signed certificate.

Figure 2:
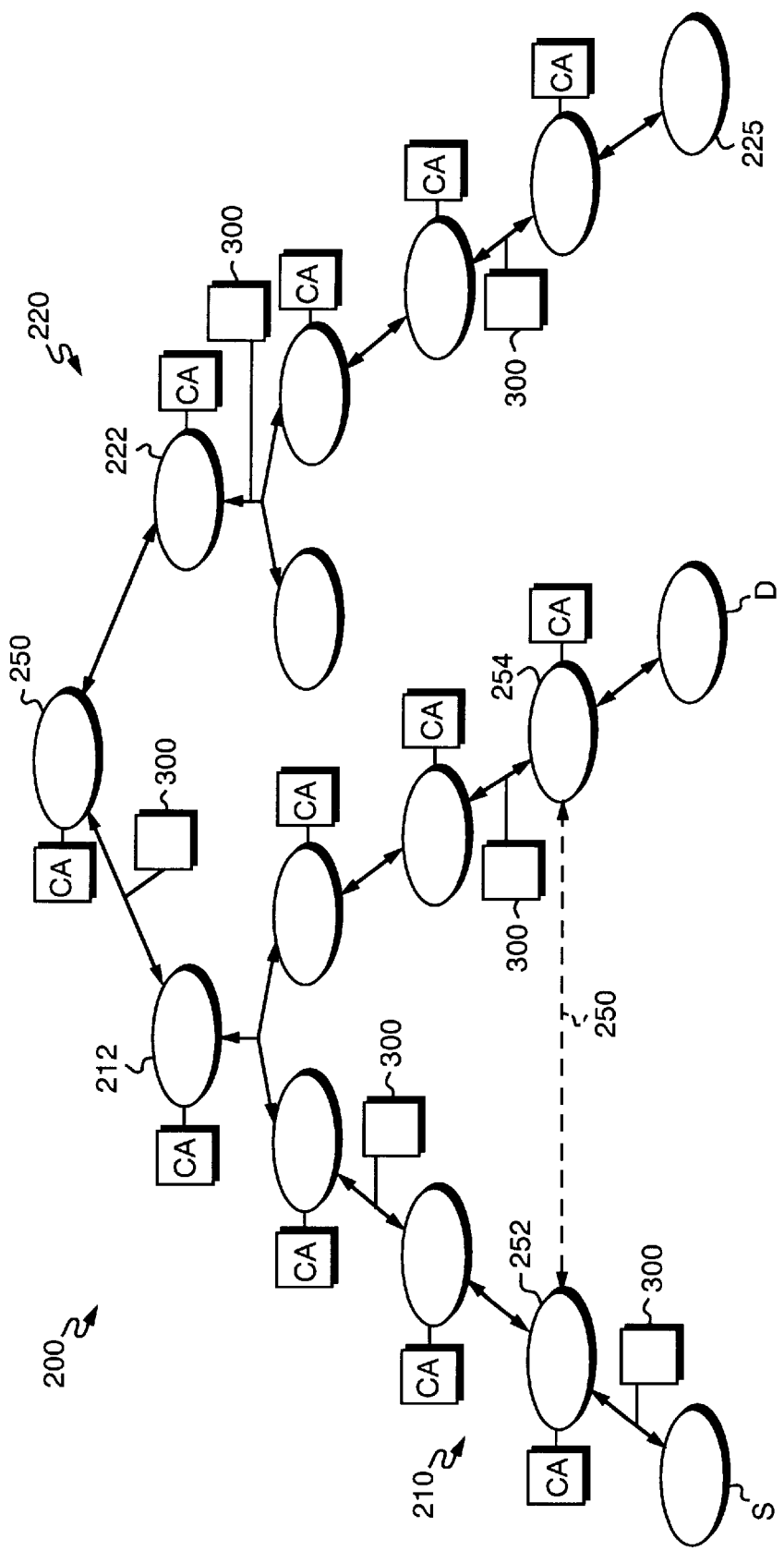
FIG. 2 is a highly schematized block diagram of a namespace in which the present invention may be advantageously used.

However, a distributed data processing network system, such as the Internet, is a heterogeneous system lacking a singular, trusted CA; accordingly, a common solution to the designation of a "trusted authority" for such a system is to provide a structure of CAs that matches the appropriate namespace of the system. Another specialized server application is a certificate storage server (CSS) 104c that functions as a directory service for storing and distributing authentication information, such as public key certificates. These certificates are preferably organized within the CSS as a namespace shown in the schematized block diagram of FIG. 2.

In the illustrative embodiment, the namespace 200 embodies a hierarchical tree data structure architecture of nodes (denoted by circles) for managing and organizing certificates 300 generated by a plurality of CAs. Each node is associated with a principal and is fer represented by a CA, whereas each lin coupling the nodes is represented by a certificate. Because the stored public keys of the certificates are known to other principals in the system, the CSS need not be a trusted authority.

To cryptographically communicate with a recipient in such a distributed system, a source S of information must verify that the certificate 300 (and thus, the public key) of the recipient D is reliable. Typically, this is achieved by traversing a chain of nodes along a subtree 210 of namespace to an ancestor node 212 that is common to the source and recipient. The CA at each end of the intervening inks along the branch typically "warrant", i.e., vouch for, the public key (and certificate) of the CA at the other end. As an alternative, a cross-link 250 may be used from a node in one portion of the namespace to a node of another portion of the namespace. The use of such a cross-i obviates the need to traverse a chain of certificates since, again, the CA 252 at one end of the link 250 vouches for the public key of the CA 254 at the other end.

The present invention is directed to key escrow implementations and, in particular, to providing an efficient and reliable technique for noticing an encrypting principal about escrow authorities requiring access to a secret key. A common technique for implementing key escrow involves encrypting a secret key (which is initially used to encrypt some information) with not only the public key of the intended recipient, but also with the public key of an escrow authority. For example, information in the form of a message M is initially encrypted with a secret key K by a source to create an encrypted message $M_K$. The secret key K is then encrypted with the public key P of the recipient to generate $K_P$ and with the public key of an escrow authority to generate $K_{P1}$; $K_{PandP1}$ are attached to message $M_K$ via a header and the resulting message/header assembly is transmitted to the recipient. If the authority decides to intercept the message, it decrypts $K_{P1}$ with its private key to recover the secret key K which is then used to decrypt the encrypted message $M_K$ to recover the original message M.

For those situations where there is more than one escrow authority or agent, the secret key K contained in the header is encrypted with the public key of each agent. The encryption key may be further divided into discrete "pieces" and provided to a set of escrow agents having a predetermined quorum for key recovery. Moreover, in some situations escrow may be complete, i.e., the entire secret key is "escrowed" to accomodate an employer's need for convenient data recovery, and sometimes it may be partial as, e.g., in the case of US federal law requirements that, at most, 40 bits of a key be kept secret from the US government.

However, a typical public key certificate or add-on module does not identify any and all escrow agents requiring access to the secret key, nor how much of that key is required by the agents. In accordance with the invention, the novel technique comprises a mechanism for storing escrow instructions pertaining to the agents and their public keys in a designated location within a certificate or add-on module. The encrypting principal may comprise a private-sector company manufacturing, distributing or purchasing hardware and software products (e.g., NetWare), a CA server generating a certificate or any source of information, including a user, desiring to encrypt such information. In any case, the encrypting principal will not only have the burden of providing US and possibly foreign government public keys within the escrow instructions, but also the public keys of the private-sector company and any other required escrow authority.

Figure 3:
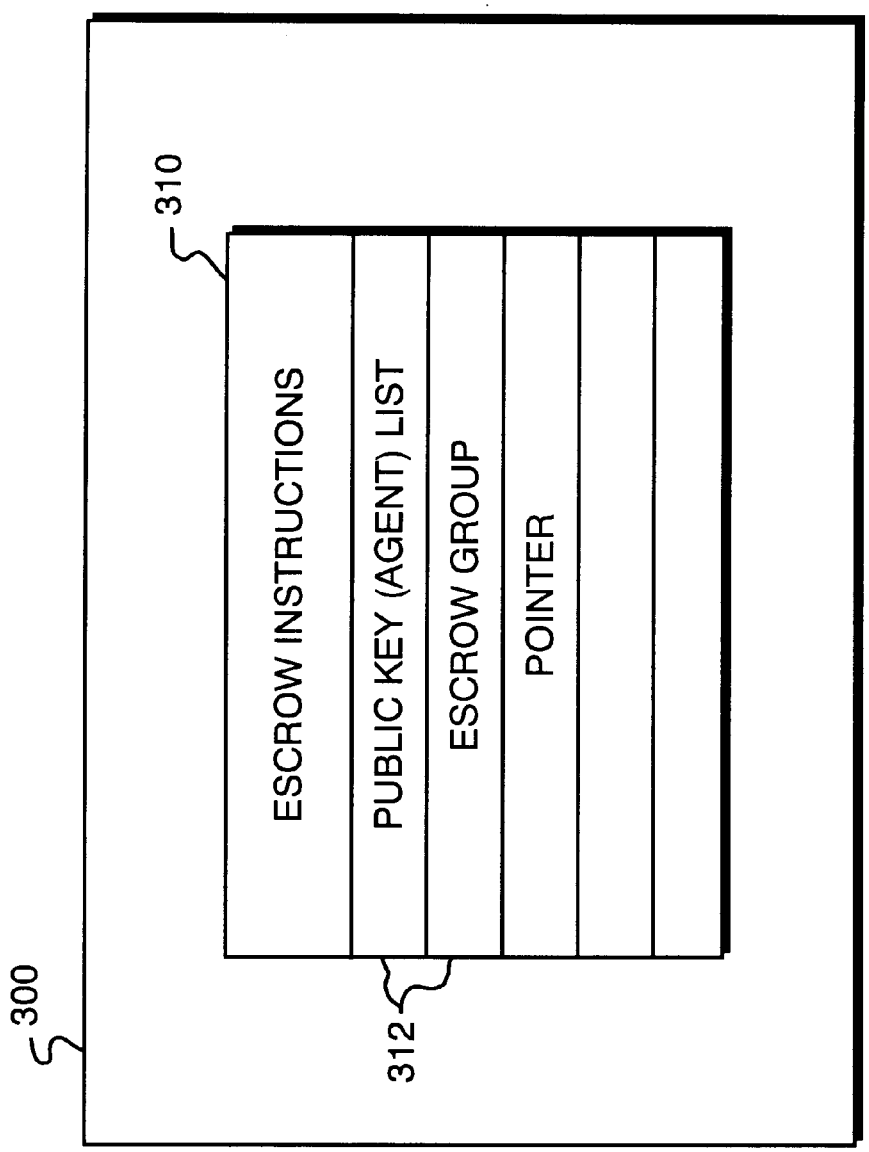
FIG. 3 is a highly schematized block diagram of a data structure contained within a software or hardware add-on module to the data processing system for storing escrow instructions in accordance with the invention.

FIG. 3 is a highly schematized block diagram of a data structure 310 that may be contained within a hardware or software add-on module for storing escrow instructions in accordance with the invention. In the illustrative embodiment, the data structure comprises, e.g., a table, stored within a licensing string area 300 or similar escrow information field of the module. The table 310 preferably contains a plurality of entries 312 for storing the instructions.

Specifically, the escrow instructions comprise a set of elements that include, at a minimum, a list of public keys of predetermined escrow agents along with a maximum number of unescrowed secret key bits. For example, the US government requires escrow of all but 40 bits of a secret key. In addition, elements of the escrow instructions may include (i) an escrow group and related instructions (e.g., the escrow arrangement of the US government "Clipper" proposal where more than one agency is required to reconstruct a secret key, along with a specified quorum); and (ii) a pointer to a common area for storing escrow information, primarily because many principals will have generally similar information.

Figure 4:
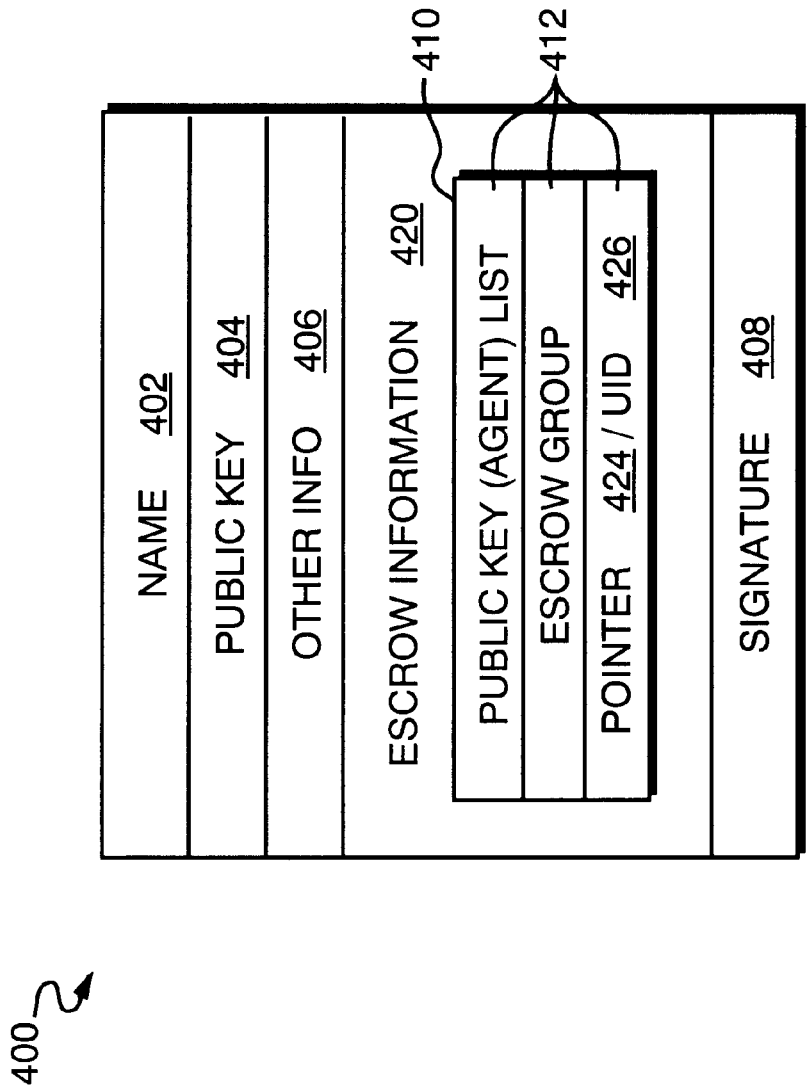
FIG. 4 is a highly schematized block diagram of a certificate having an escrow information field for storing escrow instructions in accordance with the invention.

FIG. 4 is a highly schematized block diagram of a certificate 400. As noted, the certificate is a message signed with a public key digital signature of a CA stating that a specified public key belongs to a particular principal with a specified name. As such, the certificate 400 comprises a field 402 that contains the specified principal's name, a field 404 for storing the public key, a field 406 for storing other information relating to the certificate and a field 408 that contains the digital signature of a CA.

According to the invention, the escrow instructions are also stored in a data structure 410 which, in this embodiment of the invention, is contained in an escrow information field 420 of the certificate 400. Generally, the CA generating the certificate is responsible for inserting the proper escrow instructions into the entries 412 of the (e.g., table) structure. The elements of the escrow instructions are functionally similar to those described above with the exception of the pointer element. In this case, the pointer provides a reference to another location for storing the escrow information to reduce data storage requirements of the certificate. Instead of storing the actual escrow information within the certificate 400, a pointer 424 can be placed in the escrow information field 420 that refers to a name within the namespace. Alternatively, a unique identification (UID) 426 may be substituted for the pointer, where the UID also refers to a name in the namespace. In both embodiments, the name typically references the location of another certificate having the appropriate escrow instructions.

The invention further provides a mechanism for optimizing storage capacity within the namespace of a directory service by apportioning the escrow information among various certificates. Rather than placing all of the escrow instructions within the certificates of a particular source and recipient, some of the instructions may be placed within, e.g., their ancestors in accordance with a "chain of certificates" approach. For example, a source's certificate contains escrow instructions within the escrow information field 420 for any information that source encrypts, whether for itself or for some other principal. The recipient's certificate also contains escrow instructions in the appropriate field 420. However, according to this aspect of the invention, certificates in the CA chain, i.e., subtree, between a common ancestor node and the source and recipient nodes may also contain escrow instructions. Here, the source must follow the union of all escrow information specified within that subtree chain in order to determine the required escrow agents requiring access (and the quantity of that access) to the secret key.

As a general rule, a root CA's certificate may contain escrow instructions that are "inherited" by all certificates following it in the chain; yet, there may be situations that mandate an exception to this rule. For instance and referring again to FIG. 2, a subtree 220 of namespace 200 may be designated for a foreign company; since it is a foreign company, the certificate for the CA at the root node 222 of that subtree indicates that a secret key associated with all nodes of the subtree 220 must be escrowed with the US government key.

If the foreign company has a US subsidiary division that resides and operates in the US, this latter division may not have to escrow its encryption key with the US government. Various options that are available to address this situation include: (i) provide cross-links directly to the subsidiary namespace that bypass the root CA specifying the escrow instructions; (ii) in the CA certificate of the subsidiary node 225, specify an "exception" element that negates the escrow instructions of the root (CA) node 222; or (iii) specify as an element of the root CA set of instructions that the escrow instructions contained therein are "not inherited". In order for the instructions specified by this latter option to be effective for other nodes of the subtree, those instructions must be repeated by lower-level CA certificates. This latter option may be further utilized in situations to obviate the establishment of cross-links.

As an added check, the recipient of a message may ensure that the encrypting (source) principal has fulfilled its escrow obligations by checking that public keys are provided for those escrow agents specified in the source's certificate. Upon receiving an encrypted message, the recipient can verify the identity of the source (i.e., f the source "signs" the message) and can thus access the source's public key certificate.

In the case of complete key escrow for the specified escrow agents, the cryptographic software at the recipient node decrypts the secret key K (i.e., the message encrypted with the recipient's public key) using the recipient's private key, and then re-encrypts K with a "full-escrowed" public key of each agent. The software function then performs a bit-to-bit compare of the re-encrypted public keys with the presumably) originally encrypted public keys. If they match, then the recipient is assured that key escrow was properly performed. If they do not match, the recipient's software may either refuse to further decrypt the message with K or it may fulfill the encrypting principal's obligation by providing the secret key K encrypted with the agents' public keys along with the message.

For partial key escrow, the ability of an eavesdropper to decipher the information is enhanced; therefore, for security reasons, a large random number R may be encrypted together with the extra bits of the secret key K. The random number R must be decryptable by the recipient so that it can ensure that the required partial key escrow was done properly by the source. Accordingly, copies of R and the secret key K are encrypted with the recipient's public key in the header of a message encrypted with K. For efficiency purposes, both R and K can be enclosed in the same public key encryption block; moreover, the same secret key K can be used for partial key escrow with different escrow agents and for key splitting with different escrow agents. As an example of the latter, one agent may be provided with R, while the other may be provided with K exclusively OR'ed with R.

Advantageously, the present inventive technique provides a method and apparatus for reliably informing an encrypting principal as to escrow agents requiring access to a secret key used to encrypt information. In addition to specifying the appropriate escrow authorities, the technique described herein also provides instructions as to how much of that key is required by the authorities. Furthermore, the escrow instructions are provided in an easy-to-know and easy-to-access location within an appropriate hardware or software module, or certificate, of a data processing and network system.

While there has been shown and described an illustrative embodiment for reliably notifying an encrypting principal about escrow authorities requiring access to a secret key used to encrypt information and, fer, about how much of that key is required by the authorities, it is to be understood that various other adaptations and modifications may be made within the spirit and scope of the invention. For example, the inventive technique described herein enables a plurality of principals to provide escrow instructions pertaining to escrow authorities and, further, to provide such instructions when escrow is required as a result of, e.g., the country of origin and destination for encryption information, the country from which a hardware/software product was exported, and the companies at which source and destination of information reside. According to this aspect of the invention, the purchaser of a hardware or software add-on module that activates the cryptographic system may provide the escrow instructions described herein, as may the manufacturer, distributor and/or user of the module. In addition, a CA manager may provide the appropriate escrow instructions within the certificate generated by the CA.

The foregoing description has been directed to specific embodiments of this invention. It will be apparent, however, that other variations and modifications may be made to the described embodiments, with the attainment of some or al of their advantages. Therefore, it is the object of the appended claims to cover all such variations and modifications as come within the true spirit and scope of the invention.

What is claimed is:

1. A method for reliably notifying an encrypting principal about an escrow authority requiring access to a secret key used to encrypt information, the information provided to a recipient principal for processing on a data processing system, the method comprising the steps of:

generating a data structure accessible by the encrypting principal; and storing escrow instructions in the data structure for use by the encrypting principal when encrypting information for processing by the recipient principal, the escrow instructions specifying an encryption key of the escrow authority requiring access to the secret key, such that the encrypting principal is reliably notified of the escrow authority requiring access to the secret key.

2. The method of claim 1 wherein the data structure is contained in a designated area of one of a software and hardware add-on module of the data processing system and, further, wherein the designated area is a licensing string of the module.

3. The method of claim 1 wherein the data structure is contained in a designated area of a certificate and wherein the designated area is an escrow information field of the certificate.

4. The method of claim 3 further comprising the steps of:

providing a certificate authority (CA) to generate the certificate;

organizing the generated certificate within a namespace having a tree architecture of nodes associated with principals of the data processing system, wherein the nodes are interconnected by links, and wherein each node is represented by a CA and each link is represented by a certificate.

5. The method of claim 4 wherein the step of storing comprises the step of storing escrow instructions in a chain of certificates within the namespace, the chain of certificates comprising (i) a certificate of the encrypting principal node, (ii) a certificate of the recipient principal node, and (iii) certificates of principal nodes organized between the encrypting and recipient principal nodes in the namespace.

6. The method of claim 5 further comprising the step of following the union of all escrow information specified within the chain of certificates to determine additional escrow authorities requiring access to the secret key.

7. Key escrow apparatus for reliably notifying an encrypting principal about escrow authorities requiring access to a secret key used to encrypt information, the information provided to a recipient principal for processing on a data processing system, the apparatus comprising:

a data structure of the data processing system, the data structure having a plurality of entries accessible by the encrypting principal; and means for storing escrow instructions in the entries of the data structure for use by the encrypting principal when encrypting information for processing by the recipient principal, the escrow instructions specifying the escrow authorities requiring access to a secret key and, further specifying how much of the key is required by the authorities.

8. The key escrow apparatus of claim 7 wherein the escrow instructions comprise a set of elements including a list of public encryption keys of the escrow authorities along with a maximum number of unescrowed secret key bits.

9. The key escrow apparatus of claim 8 wherein the data structure is contained in a licensing string of one of a software and hardware add-on module of the data processing system.

10. The key escrow apparatus of claim 8 wherein the data structure is contained in an escrow information field of a certificate.

11. The key escrow apparatus of claim 10 wherein the set of elements fer comprise:

an escrow group and related instructions; and a reference to a name in a namespace of the data processing system, the name providing information needed to reference a location in the namespace for accessing the appropriate escrow instructions to thereby reduce data storage requirements of the certificate.

12. The key escrow apparatus of claim 11 wherein the name comprises one of a pointer and a unique identification.

13. The key escrow apparatus of claim 12 wherein the certificate comprises:

a certificate of the encrypting principal;

a certificate of the recipient principal; and a certificate of a certificate authority needed for the encrypting principal to verify the recipient principal's certificate.

14. The key escrow apparatus of claim 12 wherein the certificate comprises one of:

a certificate of the encrypting principal;

a certificate of the recipient principal; and a certificate of a certificate authority needed for the encrypting principal to ver the recipient principal's certificate.

15. A method for reliably notifying an encrypting principal about escrow authorities requiring access to a secret key used to encrypt information, the information provided to a recipient principal for processing on a data processing network system, the method comprising the steps of generating a data structure accessible by the encrypting principal;

acquiring escrow instructions from predetermined principals of the data processing network system, the escrow instructions specifying escrow authorities requiring access to the secret key and how much of the secret key is required by the authorities; and storing escrow instructions in the data structure for use by the encrypting principal when encrypting information for processing by the recipient principal.

16. The method of claim 15 wherein the escrow instructions comprise a set of elements including (i) a list of public encryption keys of the escrow authorities along with a maximum number of unescrowed secret key bits, (ii) an escrow group and related instructions and (iii) a reference to a name m a namespace of the data processing system, the name providing information needed to reference a location in the namespace for accessing the appropriate escrow instructions.

17. The method of claim 16 wherein the data structure is contained in a licensing sting of one of a software and hardware add-on module of the data processing system.

18. The method of claim 17 wherein the predetermined principals include one of a purchaser of the module, a manufacturer of the module, a distributor of the module and a user of the module.

19. The method of claim 17 wherein the predetermined principals include a purchaser of the module, a manufacturer of the module, a distributor of the module and a user of the module.

20. The method of claim 16 wherein the data structure is contained in an escrow information field of a certificate and wherein the predetermined principals include a certificate authority (CA) manager.

* * * * *